March 28, 1967     F. W. MELPOLDER     3,310,932
GAS CHROMATOGRAPHIC COLUMNS
Filed Dec. 14, 1964     2 Sheets-Sheet 1
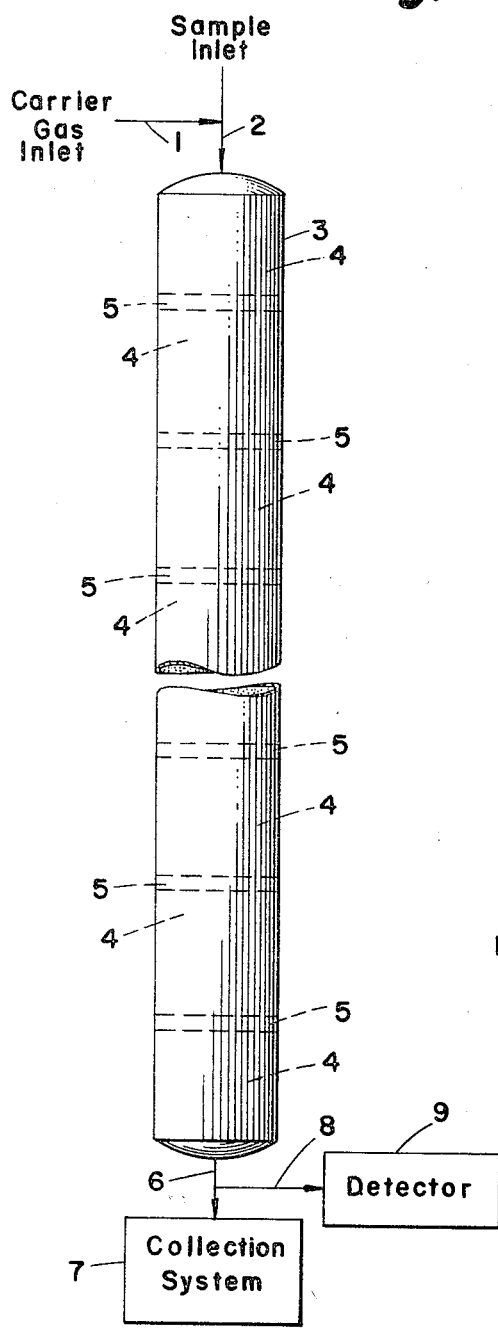
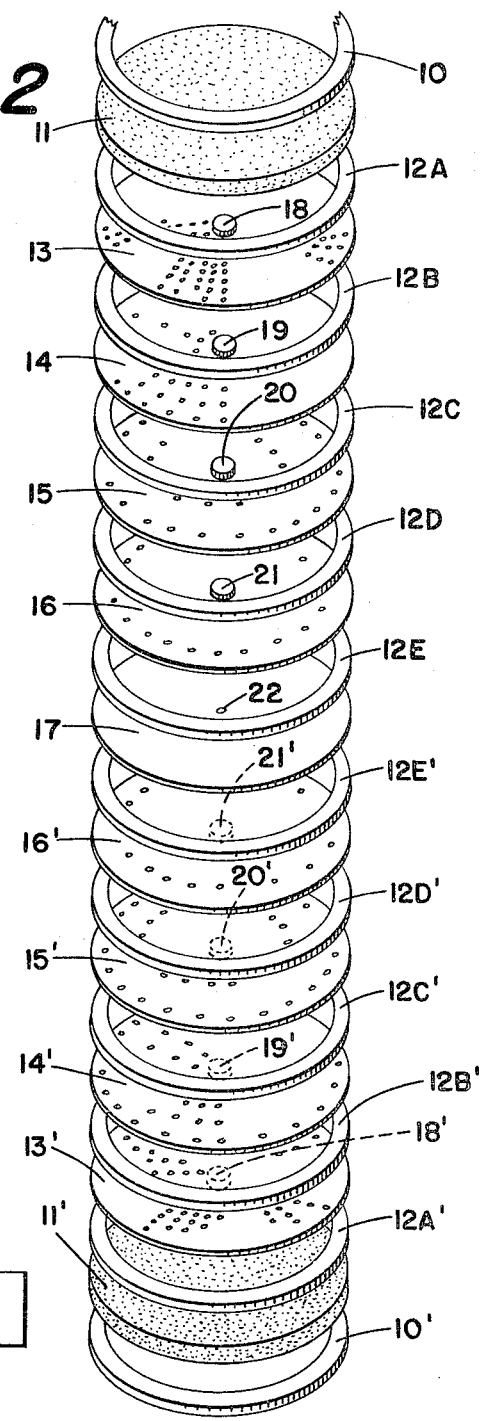
INVENTOR.
FRANK W. MELPOLDER
BY Norbert E. Birch
ATTORNEY

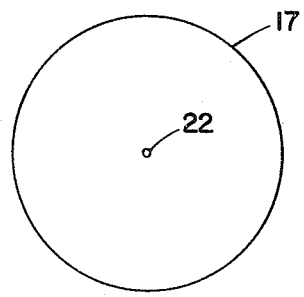
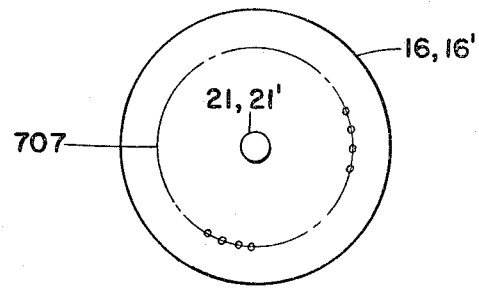
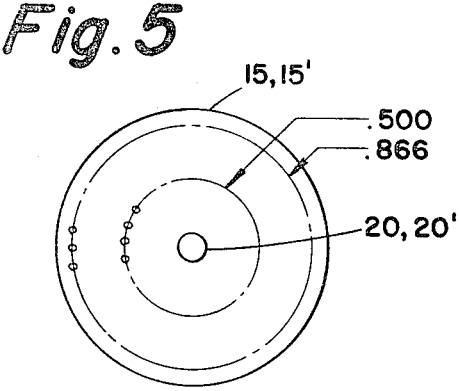
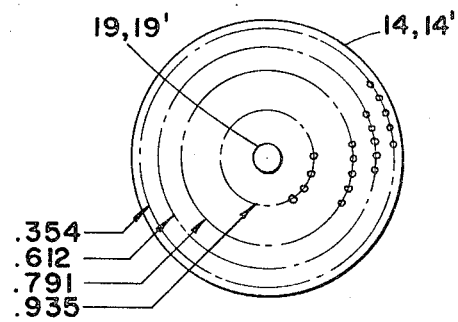
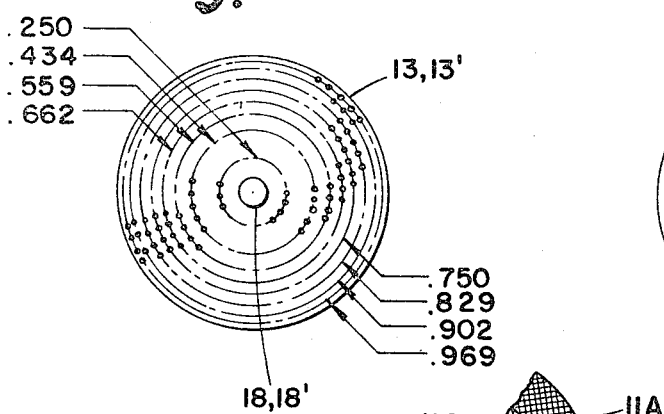
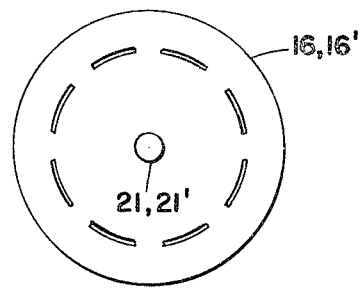
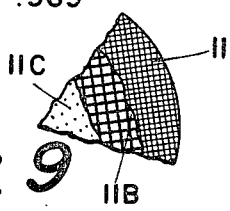

United States Patent Office 3,310,932
Patented Mar. 28, 1967

3,310,932
GAS CHROMATOGRAPHIC COLUMNS
Frank W. Melpolder, Wallingford, Pa., assignor to The Atlantic Refining Company, Philadelphia, Pa., a corporation of Pennsylvania
Filed Dec. 14, 1964, Ser. No. 417,985
3 Claims. (Cl. 55—386)

This invention relates to chromatography and particularly to improvements in chromatographic columns.

The term "gas chromatography" is applied both to adsorption chromatography and to gas-liquid partition chromatography.

In adsorption chromatography a gas sample is passed through a column containing an adsorbent in the form of granules which is used to separate the various constituents of the gas. In general, the sample is introduced into the column in a carrier gas stream which is continuously flowing through the column. The various components of the gas sample are separated by the process of selective adsorption and desorption so that the separated gas constituents issue from the end of the column in sequential order corresponding to their relative volatility, their molecular weight or some similar property such as polarity which affects the degree of their adsorption on the packing material in the column. As the separated gases emerge a portion of the flow is passed through a detector element which may comprise a thermal conductivity cell, an infrared analyzer, a mass spectrometer, a flame ionization detector or any other suitable mechanism or technique for gas analysis which is indicative of the character and amount of the gas present.

In gas-liquid partition chromatography the essential feature is the provision in the chromatographic column of a liquid surface over which the gases to be analyzed flow. This liquid surface for purposes of simplicity is considered to be in the form of a thin coating over the large exposed surface of the inert packing element or support in the column. When the gas sample is passed through a column of this type, continuous solution and evaporation takes place along the column which in effect is an extractive distillation operation in which the lighter components are carried more rapidly to the outlet of the column than the heavier components. Similar detectors are utilized to analyze the emerging gases.

Conventional packing may be employed in the chromatographic columns of this invention, for example activated carbon, alumina, silica gel, molecular sieves, diatomaceous earth, fire brick and the like. Likewise the various liquids utilized in the gas-liquid partition chromatograph processes are conventional, e.g., mineral oil, dioctyl phthalate, dibutyl phthalate, silicones, tricresyl phosphate and the like. In addition, conventional treatments may be applied to the packing, all of which are well known to the art and do not form a part of this invention. The choice of the particular adsorbent or of the liquid to be used in partition chromatography merely depends upon the particular separations that are to be made.

According to conventional practice the packing is poured into the column in granular form and is compacted therein by vibration, tamping, or various combinations of these methods. It has long been known, however, that irrespective of the method employed in compacting the packing material, when columns having diameters larger than about 1 inch are employed, the packing is inhomogeneous in a direction transverse to the vertical axis of the column. This inhomogeneity results in loss in efficiency of the columns for gas separations with the result that columns having diameters of the order of 3 inches, for example, have been found to have efficiencies of only about 20 percent of a so-called analytical column having a diameter of ¼ inch.

In order to explain this loss in efficiency with large diameter columns, it is postulated that the inhomogeneity of the packing across the column leads to an uneven flow pattern of the gas flowing down the column or, expressed in other words, the partial pressure of the sample in the carrier gas is not uniform across the area perpendicular to the axis of the column. Thus the gas, in effect, flows faster through one area of the column than through an adjacent area. Since the transverse diffusion of the gas across the column is slow in relation to the vertical movement of the gas downwardly through the column, the transverse inequalities are not eliminated by diffusion.

The present invention provides disc-shaped sections interposed between alternate layers of packing material, which sections provide for the transverse movement of the gas together with mixing in order to reestablish periodically a homogeneous sample mixture in the carrier gas stream in a transverse plane perpendicular to the axis of the column.

It is an object of this invention, therefore, to provide a highly efficient, large diameter, chromatographic column for the separation of gases.

It is another object of this invention to provide a chromatographic column for the separation of gases wherein the packing material of the column is separated into a plurality of sections by means for providing transverse flow and mixing of the gas between the packing sections.

Additional objects of this invention will become apparent from the drawings and from the description and claims that follow.

In order to attain the objects of the present invention the packing material of a chromatographic column is divided into a plurality of relatively short sections. Each packing section is separated from the one following it by a disc-shaped section which collects the gas from an upper section of packing material, mixes and directs the flow of the gas transversely across the column, thereafter passes the gas through a mixing plate, again mixes and directs the flow of the gas transversely across the column and thereafter redistributes the gas into the next lower section of packing material. In order to operate in this manner the flat surfaces of these disc-shaped sections must be in a plane perpendicular to the longitudinal axis of the column and the diameter of the section must be approximately the same as the diameter of the column, i.e. the inside or operational diameter. It has been found that if a column is constructed in this manner it can be operated at exceedingly high efficiencies, for example, columns having diameters in the range of from 1 inch to 12 inches may be operated at efficiencies of about 100 theoretical plates per foot of column packing as compared with 150 theoretical plates per foot of packing for a so-called analytical ¼ inch diameter column. Columns having diameters in the range of from 12 inches to 3 or 4 feet or more when constructed in accordance with the present invention may be operated at efficiencies which permit their use for the production of commercial quantities of materials.

The invention will be further described by reference to the drawings.

FIGURE 1 represents an elevational view of a conventional chromatographic column.

FIGURE 2 is an exploded pictorial view of the gas collecting, mixing and distributing section of the column.

FIGURE 3 is a plan view of the gas mixing plate.

FIGURE 4 is a plan view of the first gas collecting plate and the first gas distributing plate, which plates are identical in their construction.

FIGURE 5 is a plan view of the second gas collecting plate and the second gas distributing plate which plates also are identical with each other.

FIGURE 6 is a plan view of the third gas collecting plate and the third gas distributing plate which plates also are identical with each other.

FIGURE 7 is a plan view of the fourth gas collecting plate and the fourth gas distributing plate which plates also are identical with each other.

FIGURE 8 is a plan view of an alternative form of the first gas collecting plate and the first gas distributing plate wherein slots are employed as the perforating means instead of holes.

FIGURE 9 is a plan view of a sector, partially in section, of an alternative form of the combined packing support and gas collecting means and the combined packing retainer and gas distributing means, which means are identical in their construction except that one is the mirror image of the other when in use.

In FIGURE 1 the apparatus shown includes a carrier gas inlet 1 and sample inlet 2 by means of which the carrier gas and sample are introduced into the chromatographic column 3. The internal packing section of the chromatographic column 3 are designated by the numeral 4. The packing sections 4 are separated from each other by sections 5 which collect the carrier and sample gas components from a preceding packing section, mix them, and redistribute them to the next lower packing section. The effluent gas from the lowest packing section passes from the column 3 through line 6, into the collection system 7 consisting of conventional traps. A portion of the effluent in line 6 is bypassed through line 8 to a detector 9 which may be utilized either manually or in accordance with conventional automated means (not shown) to control the collection system 7.

A single gas collecting, mixing and distributing section 5 is shown in an exploded pictorial view in FIGURE 2. Starting at the top of the view, this section is composed of a retaining ring 10, a combined packing support and gas collecting means 11, a spacing and sealing ring 12A, the fourth gas collecting plate 13, spacing and sealing ring 12B, third gas collecting plate 14, spacing and sealing ring 12C, second gas collecting plate 15, spacing and sealing ring 12D, first gas collecting plate 16, spacing and sealing ring 12E, and gas mixing plate 17.

The portion of the apparatus below gas mixing plate 17 is the mirror image of the apparatus above the gas mixing plate 17. Thus immediately below gas mixing plate 17 is spacing and sealing ring 12E' which corresponds to spacing and sealing ring 12E, the first gas distributing plate 16' corresponding to first gas collecting plate 16, spacing and sealing ring 12D' corresponding to 12D, second gas distributing plate 15' corresponding to plate 15, spacing and sealing ring 12C' corresponding to ring 12C, third gas distributing plate 14' corresponding to plate 14, spacing and sealing ring 12B' corresponding to ring 12B, fourth gas distributing plate 13' corresponding to plate 13, spacing and sealing ring 12A' corresponding to ring 12A, combined packing retainer and gas distributing means 11' corresponding to combined packing support and gas collecting means 11, and retainer ring 10' corresponding to retainer ring 10.

It will be noted that although the spacing and sealing rings have been individually identified this is for purposes of clarifying and simplifying the description of the apparatus. The spacing and sealing rings in each apparatus are identical, thus 12A is identical with 12B and 12B with 12C, 12C with 12D, 12D with 12E, 12E with 12E' etc. The rings are preferably constructed of metal and may be of the split ring expandable type.

The combined packing support and gas collecting means 11 is preferably a porous metal plate or porous glass plate either of which are available commercially. Alternatively, as shown in FIGURE 9, the packing support and gas collecting means may consist of a fine mesh, e.g. 80 mesh, screen 11A, with a coarse screen, e.g. 16 mesh screen 11B, as a backing, with the 16 mesh screen 11B placed on a metal sieve plate 11C, characterized by having the sum of the cross-sectional areas of the openings amounting to from about 1 percent to 4 percent of the total cross-sectional area of the sieve plate. For example, a sieve plate having holes approximately 0.016 inch in diameter on centers about 0.1 inch x 0.125 inch will have openings amounting to about 1.5 percent of the cross sectional area of the plate. Thus since the openings are spaced uniformly over the plate and the plate fills the cross-sectional area of the column, the openings will also amount to 1.5 percent of the cross-sectional area of the column. As shown in the drawing this sieve rests on a spacing and sealing ring 12. The combined packing retainer and gas distribution means 11' also may be a porous metal plate or porous glass plate of the identical construction as the combined packing support and gas collecting means 11. Alternatively, it also may be constructed of the fine mesh screen, coarse mesh screen and sieve. However, in this instance the fine mesh screen will be at the bottom, facing the packing material, the coarse mesh screen will be in the center and the sieve will be at the top toward the distributing plate. Thus the combined packing retainer and distribution means 11' is the mirror image of the combined packing support and gas collecting means 11.

Fourth gas collecting plate 13 is shown in a plan view in FIGURE 7. It has 8 rings of perforations with the centers of the perforations on circles having the radii shown in FIGURE 7 with the radius of the plate being unity. These radii are calculated to provide an even distribution of flow of gas through the plate. This view is also a plan view of the fourth gas distributing plate 13' since the two plates are identical in construction but in use are mirror images of each other. On plate 13 there is a projection 18 having the same height as spacer ring 12A and a radius smaller than the radius of the smallest circle of perforations. This projection is for the purpose of supporting the combined packing support and gas collecting means 11 above this plate. It may be omitted but it is generally preferable to include it for the purpose of adding strength to the apparatus. In gas distributing plate 13' the projection 18' extends downwardly below the plate and supports the plate against the combined packing retainer and gas distributing means 11'. Its height is the same as the thickness of ring 12A'.

In a similar manner the third gas collecting plate 14 and third gas distributing plate 14' are shown in plan view in FIGURE 6 with the radii of the four rings of perforations being set forth which provide an even distribution of gas through the plate. These plates also may have an upward projection 19 on plate 14 or a downward projection 19' on plate 14' to provide support for the center of the apparatus. The second gas collecting plate 15 and the second gas distributing plate 15' is shown in plan view in FIGURE 5 with the two rings of perforations to provide even gas flow. The supporting projections are respectively 20 and 21'. The first gas collecting plate 16 and first gas distributing plate 16' are shown in plan view in FIGURE 4 with the single ring of perforations. The supporting projections are respectively 21 and 21'.

The gas mixing plate 17 is shown in plan view in FIGURE 3 and has but a single hole 22 in the center of the plate. Since all of the gas must pass through this hole it will mix thoroughly in passing therethrough and impinge on distributing plate 16' immediately below where additional mixing occurs.

The rings of perforations have been shown as rings of holes in the various plates, alternatively however, slots may be employed as shown in FIGURE 8 which is a view of an alternative collecting plate 16 and distributing plate 16'.

It will be noted from the distribution of the perforation rings in the collecting plates that the gas is collected from the entire area of the preceding column packing section then is successively directed in a transverse manner until it passes through the central hole of the mixing plate. The gas is then directed again transversely in successive steps to distribute it finally over the entire cross-sectional area of the next section of column packing material.

The flow rate through the mixing plate is a function of the back pressure, the molecular weight of the gas and the diameter of the hole in the mixing plate. Since the flow rate is also a function of the diameter of the column, it has been found that for a back pressure of about 1 cm. of water utilizing helium as the carrier gas, the diameter of the hole in the mixing plate should be about 4 percent of the diameter of the column. Obviously, if the hole in the mixing plate is smaller, the back pressure will be increased, whereas if it is considerably larger it will not provide sufficient mixing as the gas passes therethrough and impinges on the distributing plate below. For optimum results, therefore, the hole in the mixing plate should range between about 2 percent and 6 percent of the diameter of the column when helium is utilized as the carrier gas. When a different gas is utilized as the carrier gas, nitrogen for example, the hole may range from about 6 percent to 8 percent of the diameter of the column. It will be understood, however, that the size of the hole in the mixing plate will be determined by the molecular weight of the carrier gas, the back pressure through the hole and the flow rate of the gas.

It has been found that with columns having diameters from 1 inch up to about 10 inches, one collecting plate 16, in FIGURE 2 of the drawing above the mixing plate 17, and one distributing plate 16', below the mixing plate 17 are sufficient. For columns having diameters from 10 inches to about 20 inches, two collecting plates 15 and 16 above the mixing plate 17 and two distributing plates 15' and 16' below the mixing plate 17 are preferable; for columns having diameters from about 20 inches to about 40 inches, three collecting plates 14, 15 and 16 above the mixing plate 17 and three distributing plates 14', 15' and 16' below the mixing plate 17 are preferred; with columns having diameters of 40 inches or more, four collecting plates 13, 14, 15 and 16 above the mixing plate 17 and four distributing plates 13', 14', 15' and 16' below the mixing plate 17 are preferred. This relationship can be expressed by the equation $$D = 5(2)^{N-1}$$

wherein N is the number of collecting or distributing plates and is an integer between 1 and 4, with D in inches.

As set forth in the description of the drawings of the collecting plates and distributing plates, the collecting plate 16, and distributing plate 16', nearest the mixing plate 17 contains one ring of perforations. These perforations are centered on a circle which bisects the cross-sectional area of the plate. In this manner equal numbers of gas molecules pass through the perforations from the outer periphery of the plate as from the inner area of the plate. The radius of this circle, if it be assumed that the radius of the column is unity, is given by the equation $$r = \sqrt{1/2}$$

The value of $r$ is in this instance 0.707 as shown in the drawing. This number may be multiplied by the actual radius of the column in order to locate the circle. The second gas collecting plate 15 and second gas distributing plate 15', have their perforations on circles located in a similar manner, i.e. for the inner circle $$r = \sqrt{1/4}$$

and for the outer circle $$r = \sqrt{3/4}$$

In general the radius $r$ of each perforation ring is given by the equation $$r = \sqrt{m/2^n}$$

wherein $n$ is the number of the plate as numbered from the central gas mixing plate and $m$ are the odd integers between 1 and $2^n - 1$. It will be apparent, of course, that the collecting plates are numbered upwardly from the mixing plate, whereas the corresponding distributing plates are numbered downwardly.

For a column of diameter D inches, the radius R in inches of each perforation ring is $$R = \frac{D}{2}\sqrt{\frac{m}{2^n}}$$

wherein $n$ and $m$ have the same values as in the previous equation.

In order to avoid back pressure the sum of the cross-sectional areas of the perforations through a collecting plate or a distributing plate should not be less than the cross-sectional area of the central hole through the mixing plate. In general, however, the sum of the cross-sectional areas of the perforations will be considerably in excess of the cross-sectional area of the hole in the mixing plate. When holes are used as perforations in the collecting plates and distributing plates, it is preferred that the holes be spaced from ½ inch to 1 inch apart on the circle forming the locus of their centers. If slots are utilized as shown in FIGURE 8, it is preferred that they be spaced so that they do not occupy more than about 50 percent of the circumference of the circle, and that their total cross-sectional area is not less than the cross-sectional area of the hole through the gas mixing plate.

The spacing and sealing rings designated by the numeral 12 and a letter in FIGURE 2 of the drawing may range in thickness from 1/16 inch to 1 inch in order to provide spaces between the plates of from 1/16 inch to about 1 inch. The spacings desired vary with the diameter of the column. The 1/16 inch spacing is suitable for column diameters up to 5 inches and thereafter the spacings are increased in proportion to the diameter ranging up to a maximum of 1 inch for column diameters of 3 to 4 feet or more.

In order to attain the objects of this invention the packing sections designated 4 in FIGURE 1 should range in depth between 6 inches and 1 foot. For columns ranging from 1 inch in diameter to about 1 foot in diameter, the 6 inch depth of packing is preferred, however, with columns having diameters greater than about 12 inches the depth of packing can be increased as desired until the 1 foot maximum depth is reached.

The collecting plates, distributing plates and mixing plates may be constructed of metal or glass but stainless steel is preferred because of its strength and low catalytic activity. The thickness of the collecting, distributing and mixing plates is no critical, however, it should be sufficient to provide the necessary structural strength.

In order to demonstrate the utility and efficiency of the apparatus comprising the present invention a three-inch inside diameter chromatographic column was constructed with the packing material 3½ feet long. The packing consisted of crushed firebrick 30–35 mesh which had been coated with 20 weight percent of a methyl silicone fluid having a viscosity of 500 centistokes at 25° C. The packing was compacted by conventional vibrational and tamping methods. The packing was divided into seven 6 inch sections by means of 6 collecting, mixing and distributing means to be described. Starting at the top, each of these means consisted of a retaining ring, an 80 mesh screen, a 16 mesh screen, and a metal sieve plate having holes approximately 0.016 inch in diameter on centers about 0.1 inch x 0.125 inch so that the opening amounted to about 1.5 percent of the cross-sectional area of the sieve plate. This structure is shown in FIGURE 9 of the drawings.

Below the sieve plate was placed a spacing and sealing ring having a thickness of approximately 1/16" and below this sealing ring was placed a collecting plate like that shown in FIGURE 4 of the drawings. The sealing and spacing ring prevented flow of gas around the perimeter of the plates and the walls of the column and at the same time provided a space of about 1/16" between the sieve plate and the collecting plate for the transverse flow of gas across the column. Below the collecting plate was placed another identical spacing and sealing ring and below this ring a mixing plate like that shown in FIGURE 3 of the drawings. The hole in the mixing plate was approximately 1/8" in diameter. Below the mixing pate was another spacing and sealing ring like those described, and below this ring was placed a distributing plate like that shown in FIGURE 4 of the drawings. This plate was followed by another spacing and sealing ring and thereafter a sieve plate, 16 mesh screen, 80 mesh screen, and retaining ring, i.e. the same elements in reverse order as described for the top of the apparatus. Each of these collecting, mixing and distributing means was placed carefully in the columns such that their flat surfaces would be in a plane perpendicular to the longitudinal axis of the column.

The column was tested by utilizing n-pentane as the sample gas with helium as the carrier gas. With a 1/2 ml. charge of n-pentane the column had an efficiency of 130 theoretical plates per foot of packing. With 1 ml. charge the column had an efficiency of 118 theoretical plates per foot of packing. With a 2 ml. charge the column had an efficiency of 92 theoretical plates per foot of packing. In each case the charge was passed through the column in 20 minutes. It was calculated that this 3" column had an efficiency at the 2 ml. charge level of 63 percent of that of a 1/4" analytical column loaded to the same relative capacity, thus showing that not only had the apparatus of the present invention permitted the use of large diameter columns but they could be operated in a highly efficient manner.

A second column was constructed having an inside diameter of 3 3/8 inches and 7 feet of packing. The packing was divided into 6 inch sections by 13 collecting, mixing and distributing means identical with the collecting, mixing and distributing means described for the 3 inch column except, of course, they had the larger diameter. The packing and the coating for the packing also were the same as utilized in the 3 inch column heretofore described. The packing was also compacted by conventional vibration and tamping methods. In one test run a mixture of $C_{11}$ to $C_{14}$ n-paraffins were passed through the column as a 10 ml. sample in helium as the carrier gas at a temperature of 180° C. The total time for the analysis was approximately 20 minutes. The efficiency based on the elution of the n-dodecane fraction was 100 theoretical plates per foot of packing. Each of the n-undecane, n-dodecane, n-tridecane and n-tetradecane compounds were completely resolved and were collected at a purity in excess of 99 percent. Several runs were made utilizing various mixtures of hydrocarbons in order to compare the efficiency of this column with the efficiency of an analytical 1/4 inch diameter column having the same packing. The packing in the analytical column was 7 feet long but there were no collecting, mixing and distributing means in the column. It was found that the large diameter column had efficiencies in the range of between 70 percent and 80 percent of the analytical column.

Clearly, therefore, it will be seen that the instant invention provides a means for utilizing large diameter chromatographic columns, which columns have not heretofore been possible to construct and operate in an efficient manner.

I claim:

1. In a column for the chromatographic separation of a gas sample flowing through the column, the combination comprising a plurality of packing sections filled with packing material, each of said packing sections separated from the one following by a disc-shaped gas collecting, mixing and distributing section, said latter section being free of said packing material and having a diameter approximating the inside diameter of the column with flat surfaces in planes perpendicular to the longitudinal axis of the column, said collecting, mixing and distributing section being adapted to receive gas from a preceding packed section, to mix and direct gas transversely across the column and to distribute gas substantially uniformly to a succeeding packed section, said collecting, mixing and distributing section comprising a central gas mixing plate provided with only one hole, said hole located at the center of said plate, at least one gas collecting plate upstream of said mixing plate and at least one gas distributing plate downstream of said mixing plate, each of said gas collecting plates and said gas distributing plates being provided with perforations located toward the outer periphery of said plates and offset from said hole in said gas mixing plate with no perforations located other than toward said outer periphery to provide non-axially aligned gaseous flow passages between said mixing plate and said adjacent gas collecting plate and between said mixing plate and said adjacent gas distributing plate.

2. In a column for the chromatographic separation of a gas sample flowing through the column, the combination comprising a plurality of sections filled with packing material, each of said packing sections separated from the one following by a disc-shaped gas collecting, mixing and distributing section having a diameter approximating the inside diameter of the column, said collecting, mixing and distributing section comprising a central gas mixing plate provided with a hole located at the center of said plate, N gas collecting plates above said mixing plate and N gas distributing plates below said mixing plate, wherein N is an integer ranging from 1 to 4, the number of said gas collecting plates being equal to the number of said gas distributing plates, each of said gas collecting plates and said gas distributing plates being provided with perforations located on circles, the radius $r$ of each circle given by the equation $$r = \sqrt{m/2^n}$$

wherein $n$ is the number of the plate as numbered from said gas mixing plate, and $m$ is an odd integer ranging between 1 and $2^n - 1$, and the radius of the column is unity, a combined packing support and gas collecting means immediately above the uppermost gas collecting plate, a combined packing retainer and gas distributing means immediately below the lowest gas distributing plate, the flat surfaces of said collecting means, said plates and said distributing means being in a plane perpendicular to the longitudinal axis of said column, spacing and sealing means between (1) said combined packing support and gas collecting means and said uppermost gas collecting plate, (2) said gas collecting plates, (3) a gas collecting plate and said mixing plate, (4) said gas mixing plate and a gas distributing plate, (5) said gas distributing plates, and (6) said lowest distributing plate and said combined packing retainer and gas distributing means, said spacing and sealing means preventing the flow of gas between the walls of the column and, respectively, the circumference of said gas collecting means, the circumference of said plates and the circumference of said distributing means and providing spaces between said gas collecting means, said plates, and said gas distributing means for the transverse flow of gas therebetween.

3. In a column for the chromatographic separation of a gas sample flowing through the column, the combination comprising a plurality of sections filled with packing material, each of said packing sections separated from the one following by a disc-shaped gas collecting, mixing and distributing section having a diameter approximating the inside diameter of the column, and in a plane perpendicular to the axis of the column said collecting, mixing and distributing section comprising a central gas mixing plate provided with a hole located at the center of said plate, N gas collecting plates above said mixing plate and N gas distributing plates below said mixing plate, wherein N is an integer ranging from 1 to 4, the number of said gas collecting plates being equal to the number of said gas distributing plates and related to the diameter of the column by the equation $D=5(2)^{N-1}$, wherein D the diameter of the column is in inches, each of said gas collecting plates and said gas distributing plates being provided with perforations located on circles, the radius R in inches of each circle given by the equation $$R = D/2\sqrt{m/2^n}$$

wherein $n$ is the number of the plate as numbered from said gas mixing plate, and $m$ is an odd integer ranging between 1 and $2^n-1$, a combined packing support and gas collecting means immediately above the uppermost gas collecting plate, a combined packing retainer and gas distributing means immediately below the lowest gas distributing plate, spacing and sealing means between (1) said combined packing support and gas collecting means and said uppermost gas collecting plate, (2) said gas collecting plates, (3) a gas collecting plate and said mixing plate, (4) said gas mixing plate and a gas distributing plate, (5) said gas distributing plates, and (6) said lowest distributing plate and said combined packing retainer and gas distributing means, said spacing and sealing means preventing the flow of gas between the walls of the column and, respectively, the circumference of said gas collecting means, the circumference of said plates and the circumference of said distributing means and providing spaces between said gas collecting means, said plates, and said gas distributing means for the transverse flow of gas therebetween.

References Cited by the Examiner

UNITED STATES PATENTS 3,230,167  1/1966  Golay _____ 55—386
3,250,058  5/1966  Baddour _____ 55—67

REUBEN FRIEDMAN, *Primary Examiner.*